(12) United States Patent
Ramon Mesa et al.

(10) Patent No.: US 12,179,243 B2
(45) Date of Patent: Dec. 31, 2024

(54) MULTI WASTE PROCESSOR

(71) Applicant: Hamilton Sundstrand Corporation, Charlotte, NC (US)

(72) Inventors: Jorge Ramon Mesa, League City, TX (US); Gary Robert Spexarth, Houston, TX (US); John Guinn, League City, TX (US); Michael Paul Humbert, Wethersfield, CT (US); Jeremy M. Strange, Windsor, CT (US); Terrell Lee Morrison, League City, TX (US); Cory Kaufman, Saint Louis, MO (US); David G. Converse, Blandford, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 854 days.

(21) Appl. No.: 17/226,381

(22) Filed: Apr. 9, 2021

(65) Prior Publication Data
US 2022/0324002 A1    Oct. 13, 2022

(51) Int. Cl.
*B09B 3/40*    (2022.01)
*B01D 5/00*    (2006.01)
(Continued)

(52) U.S. Cl.
CPC .............. *B09B 3/40* (2022.01); *B01D 5/006* (2013.01); *B01D 5/0069* (2013.01); *B01D 53/86* (2013.01); *C02F 1/048* (2013.01)

(58) Field of Classification Search
CPC .. B09B 3/40; B09B 3/32; B01D 5/006; B01D 5/0069; B01D 53/86; B01D 2257/80;
(Continued)

(56) References Cited

U.S. PATENT DOCUMENTS

| 3,947,327 A | * | 3/1976 | Greenfield | ............... B01D 1/26 159/DIG. 25 |
| 4,745,691 A | * | 5/1988 | Bradbury | ............... F26B 17/20 34/377 |

(Continued)

FOREIGN PATENT DOCUMENTS

CN    111804712 A    10/2020

OTHER PUBLICATIONS

Extended European Search Report for Application No. 22166827.0 issued Sep. 8, 2022.

*Primary Examiner* — John P McCormack
(74) *Attorney, Agent, or Firm* — CANTOR COLBURN LLP

(57) ABSTRACT

A multi-waste processing system includes a processing chamber. The processing chamber includes one or more heaters and a piston, and the processing chamber is configured to evaporate liquid waste and compact solid waste input. A condenser is operably connected to the processing chamber. The condenser is configured to condense water from the evaporated liquid waste output from the processing chamber. A gas and water separator is operably connected to the condenser. The gas and water separator is configured to separate water from the evaporated liquid waste output from the processing chamber. A recirculation pathway connects the gas and water separator to the processing chamber to recirculate gas from the gas and water separator to the processing chamber. The piston is actuated to keep the one or more heaters in close proximity to the solid waste and the liquid waste in the processing chamber.

19 Claims, 5 Drawing Sheets

(51) Int. Cl.
*B01D 53/86* (2006.01)
*C02F 1/04* (2023.01)

(58) Field of Classification Search
CPC ........ B01D 2258/02; B01D 2259/4575; B01D 53/002; B01D 53/265; C02F 1/048
USPC .......................................................... 34/60
See application file for complete search history.

(56) References Cited

U.S. PATENT DOCUMENTS

| | | | |
|---|---|---|---|
| 5,273,719 | A | 12/1993 | Kishi et al. |
| 6,258,215 | B1 | 7/2001 | Samsonov et al. |
| 7,024,800 | B2* | 4/2006 | Gorbell et al. ......... F26B 23/02 |
| | | | 34/576 |
| 10,653,280 | B2 | 5/2020 | Torres et al. |
| 2002/0185016 | A1 | 12/2002 | Hoffjann et al. |
| 2011/0283554 | A1* | 11/2011 | Kuhnau ................ F26B 21/083 |
| | | | 34/79 |
| 2012/0055777 | A1 | 3/2012 | Fima et al. |
| 2014/0259730 | A1* | 9/2014 | Zielinski ................... F26B 9/06 |
| | | | 34/92 |
| 2018/0015515 | A1* | 1/2018 | Sivakumar .............. C10B 53/07 |
| 2018/0354218 | A1* | 12/2018 | Stapleton ................ B30B 9/305 |
| 2020/0033057 | A1* | 1/2020 | Smis ...................... F26B 15/14 |
| 2020/0198991 | A1 | 6/2020 | Bower et al. |

* cited by examiner

MULTI WASTE PROCESSOR

BACKGROUND

Exemplary embodiments pertain to the art of waste processing, especially waste processing in a space environment.

In manned space environments, such as space stations, there is a large volume of waste that is produced and processed. For example, on the International Space Station (ISS) about 20 lbs of urine is produced per day, which is processed by a urine processing assembly (UPA) onboard the ISS. The processing at the UPA typically recovers about 80% of the water content, while the resulting brine is stored or processed by a specialized Brine Processing Assembly (BPA). Fecal matter and vomit are processed by a Universal Waste Management System (UWMS). Solid waste from food and goods packaging, used clothing, wipes, tissues, food scraps, and other waste streams is currently stored in bags on the ISS. A system which can reduce the footprint of the trash while being flexible enough to handle multiple waste streams while collecting water provides a huge benefit as resource utilization is a critical element of human space exploration.

BRIEF DESCRIPTION

In one embodiment, a multi-waste processing system includes a processing chamber. The processing chamber includes one or more heaters and a piston, and the processing chamber is configured to evaporate liquid waste and compact solid waste input. A condenser is operably connected to the processing chamber. The condenser is configured to condense water from the evaporated liquid waste output from the processing chamber. A gas and water separator is operably connected to the condenser. The gas and water separator is configured to separate water from the evaporated liquid waste output from the processing chamber. A recirculation pathway connects the gas and water separator to the processing chamber to recirculate gas from the gas and water separator to the processing chamber. The piston is actuated to keep the one or more heaters in close proximity to the solid waste and the liquid waste in the processing chamber.

Additionally or alternatively, in this or other embodiments a water collector is operably connected to the gas and water separator Additionally or alternatively, in this or other embodiments a vacuum pump is operably connected to the processing chamber to reduce a pressure inside the processing chamber thereby reducing a boiling point of the liquid waste.

Additionally or alternatively, in this or other embodiments the one or more heaters are configured to sterilize the compacted solid waste.

Additionally or alternatively, in this or other embodiments the processing chamber is configured to produce geometrically stable compacted solid waste.

Additionally or alternatively, in this or other embodiments the piston is driven by one of a linear actuator or a screw drive.

Additionally or alternatively, in this or other embodiments a vent is configured to dispose of or collect processed gas.

Additionally or alternatively, in this or other embodiments a catalytic oxidation reactor is thermally integrated with the processing chamber.

Additionally or alternatively, in this or other embodiments a compressor is configured to compress processed gas, and an accumulator is configured to store the compressed processed gas.

Additionally or alternatively, in this or other embodiments the solid waste is compacted by greater than 80%.

Additionally or alternatively, in this or other embodiments a heater of the one or more heaters is located in the piston.

In another embodiment, a method of multi-waste processing includes inputting a volume of solid waste and a volume of liquid waste into a processing chamber, heating the processing chamber via one or more heaters to evaporate the liquid waste therein, outputting the evaporated liquid waste in gas phase to a gas and water separator, condensing water from the evaporated liquid waste in gas phase at the condenser, separating water from gas at the separator, and directing gaseous products of the gas and water separator to the processing chamber via a recirculation line.

Additionally or alternatively, in this or other embodiments the method includes compacting the solid waste at the processing chamber via actuation of a piston at the processing chamber.

Additionally or alternatively, in this or other embodiments the compacted solid waste is geometrically stable.

Additionally or alternatively, in this or other embodiments the solid waste is compacted by greater than 80%.

Additionally or alternatively, in this or other embodiments the condensed water is collected at a water collector.

Additionally or alternatively, in this or other embodiments a pressure inside the processing chamber is reduced thereby reducing a boiling point of the liquid waste.

Additionally or alternatively, in this or other embodiments a processed gas is disposed of via a vent.

Additionally or alternatively, in this or other embodiments the processed gas is treated via catalytic oxidation in a reactor that is thermally integrated with the processing chamber.

Additionally or alternatively, in this or other embodiments processed gas is compressed at a compressor, and the compressed processed gas is collected at an accumulator.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
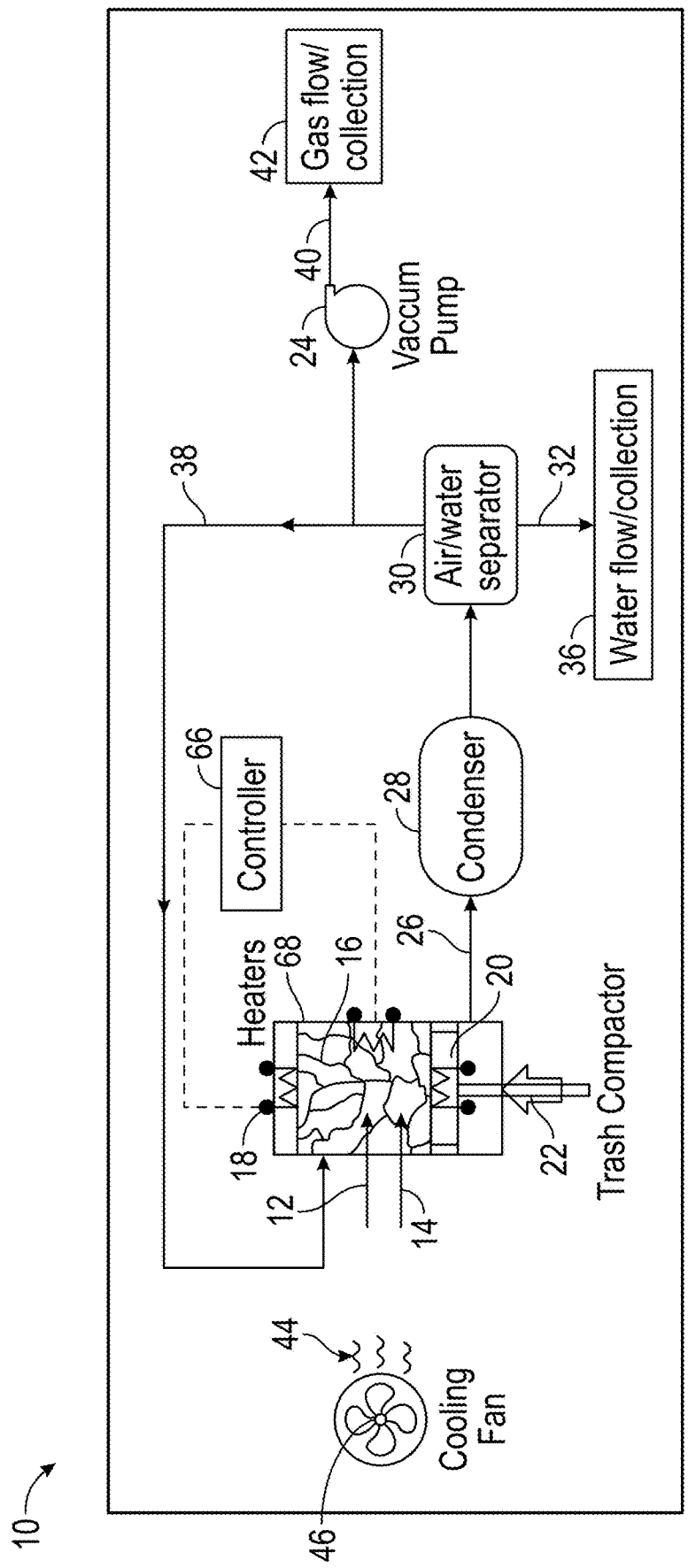
FIG. 1 is a schematic illustration of an embodiment of a multi-waste processor.

Illustrated in FIG. 1 is a schematic view of an embodiment of a multi-waste processor 10. The multi-waste processor 10 is utilized to process both liquid waste 12, such as urine, and other solid waste 14, such as plastic, feces, and other trash, resulting in a considerable savings in weight and volume relative to typical systems, which is of utmost importance in an environment such as a space station.

The liquid waste 12 and the solid waste 14 are input into a processing chamber 16. The liquid waste 12 and solid waste 14 may be from a variety of sources, such as a universal waste management system (UWMS), also known as a "space toilet" or a urine processing assembly (UPA), which would provide feces, brine and/or urine to the processing chamber 16. The processing chamber 16 includes one or more heaters 18, and a piston 20 located inside the processing chamber 16 utilizing, for example, a screw drive 22 or alternatively a linear actuator connected to the piston 20 to drive movement of the piston 20 in the processing chamber 16. In some embodiments, a heater 18 of the one or more heaters 18 is located in the piston 20. Once the liquid waste 12 and the solid waste 14 are placed in the processing chamber 16, the pressure inside the processing chamber 16 is lowered by removing much of the air from the processing chamber 16 by use of, for example, a vacuum pump 24 connected to the processing chamber 16. Lowering the pressure reduces the boiling point of the water content of the waste and facilitates the extraction of water from the waste.

Figure 4:
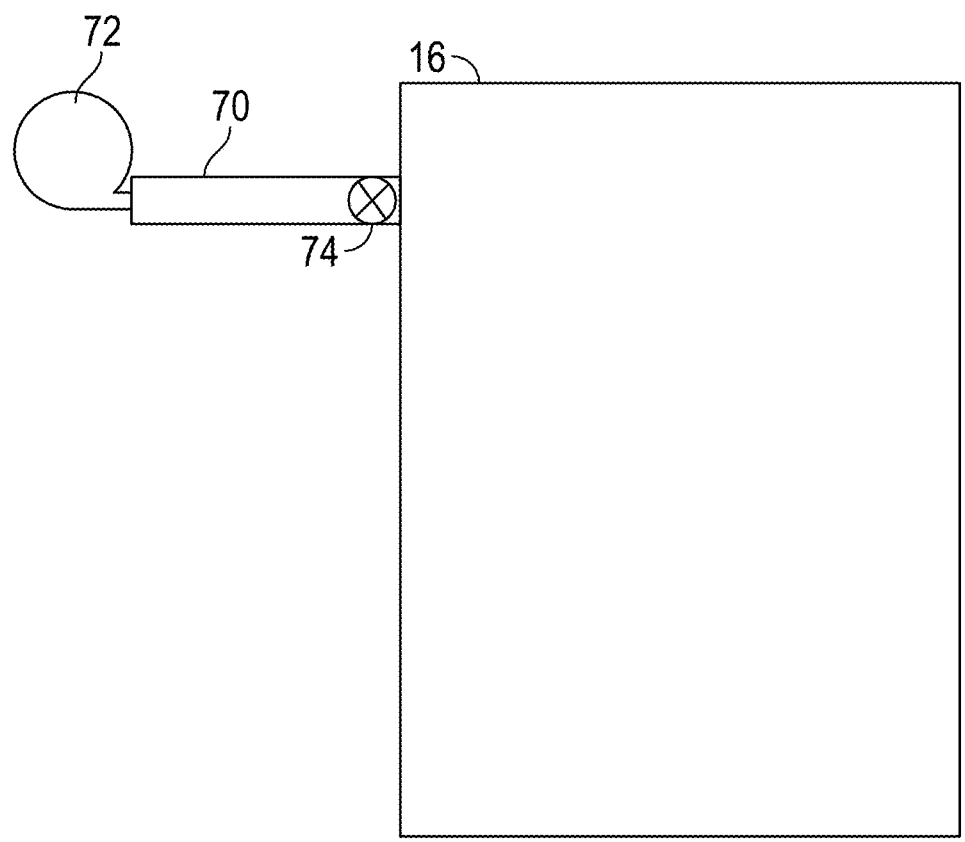
FIG. 4 is a schematic illustration of an embodiment of a liquid waste inlet arrangement to the processing chamber.

The one or more heaters 18 are activated thus evaporating, or in some instances boiling, the liquid waste 12 and producing gas effluent 26 which is directed from the processing chamber 16 to a condenser 28. In some embodiments, the one or more heaters 18 are operated via solid state relays for fast switching between on/off, and are controlled by a proportional-integral-derivative (PID) controller 66 operably connected to the one or more heaters 18 to reduce power usage by the one or more heaters 18 while still effectively processing waste in the processing chamber 16. In the condenser 28, water 32 is condensed from the gas effluent forming a two-phase flow which then proceeds to a separator 30. In some embodiments, a microporous bag 68, liner, or the like with a temperature resistant fitting is located inside of the processing chamber 16 when the input is mostly liquid waste 12, for example. The fitting is closed to contain the solid waste 14 portion, and during the heating and compression, the liquid waste 12 is removed from the bag 68 through the micropores, while the solid waste remains in the bag 68. Alternatively, such as shown in FIG. 4, the liquid waste 12 may be loaded into the processing chamber 16 without such a bag, via one or more input hoses 70 and input pumps 72. The processing chamber 16 is provided with an input valve 74 to prevent undesired flow of the liquid waste 12 from the processing chamber 16

At the separator 30, water 32 is separated from the gas effluent 26. In some embodiments, the separator utilizes one or more of a condensing heat exchanger, rotor, membrane, adsorbent or the like to separate the water 32 from the gas effluent 26. The water 32 is directed from the separator 30 to a water collector 36, while gas byproducts from the separator 30 are returned to the processing chamber 16 via a recirculation line 38. This process is repeated until a predefined amount or percentage of the water 32 content is removed from the waste 12/14 and collected in the water collector 36. In some embodiments, greater than 90% of the water content is removed. To ensure thorough processing of the liquid waste 12 and the solid waste 14, the piston 20 is actuated to keep the heaters 18 in close contact with the waste 12/14, and to compress the solid waste 14 in the processing chamber 16. In some embodiments, the screw drive 22 includes one or more features, for example a thread shape or locking mechanism, which prevents the liquid waste 12 and the solid waste 14 in the processing chamber 16 from moving the piston 20 from its selected position.

In some embodiments, the one or more heaters 18 not only evaporate the liquid waste 12, but also soften or melt components of the solid waste 14, for example, plastics, to improve compaction of the solid waste 14. In some embodiments, the solid waste 14 is compacted by greater than 80%. Once the heating process is completed, the processing chamber 16 may be cooled by, for example, a cooling airflow 44 from a fan 46.

Figure 2:
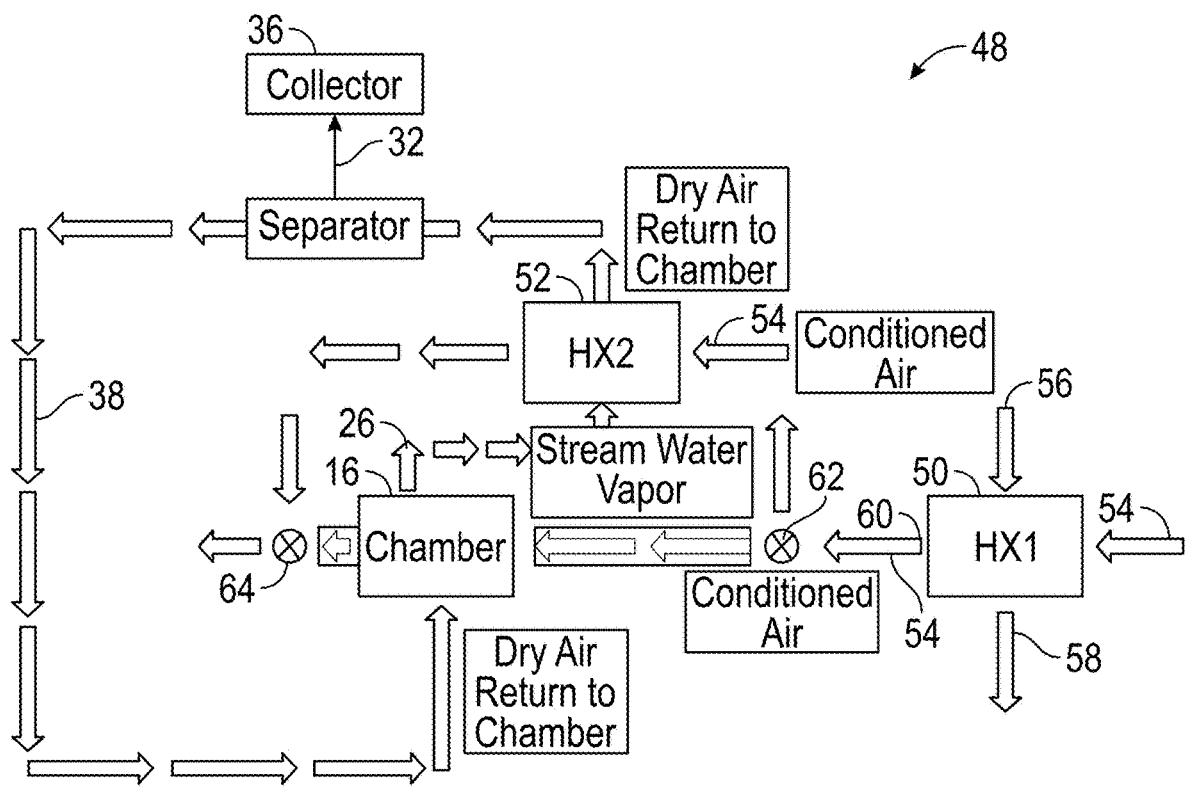
FIG. 2 is a schematic illustration of a multi-waste processor including a thermal control assembly operating in a vapor condensation mode.
Figure 3:
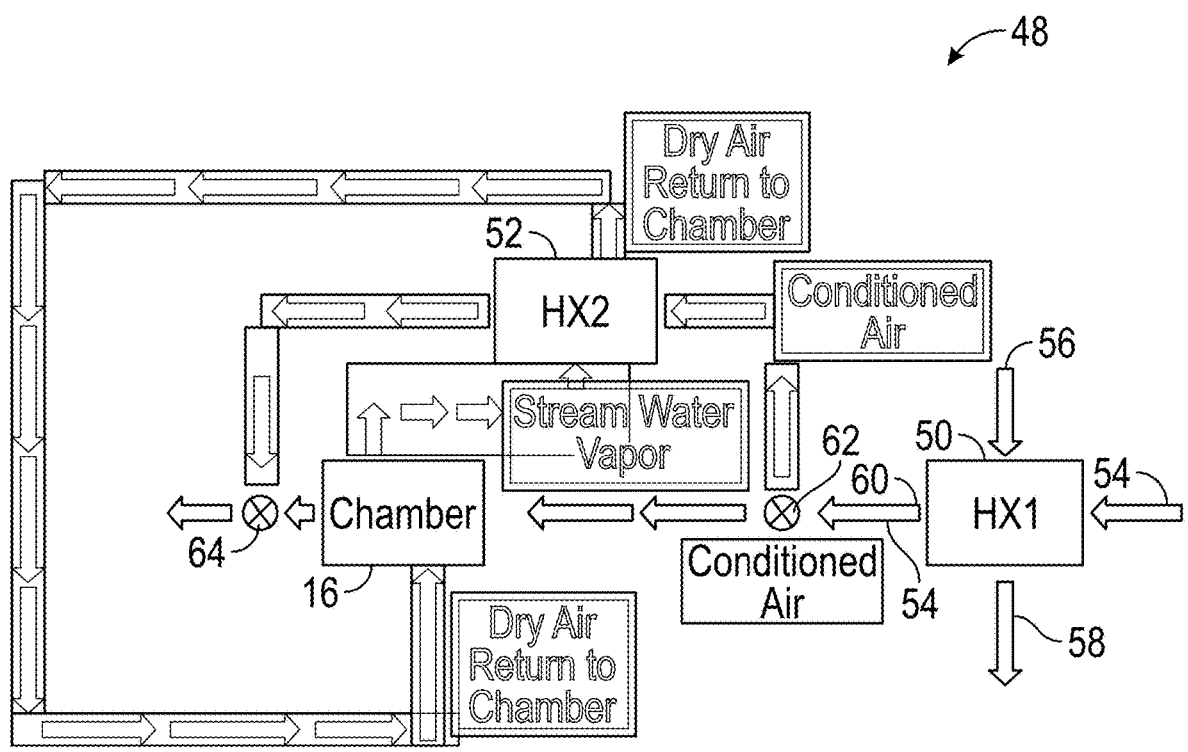
FIG. 3 is a schematic illustration of a multi-waste processor including a thermal control assembly operating in a chamber cooling mode.

In other embodiments, as illustrated in FIG. 2 and FIG. 3, the multi-waste processor 10 includes a thermal control assembly 48. The thermal control assembly 48 includes a first heat exchanger 50 and a second heat exchanger 52 and is configured to operate in a condensing mode illustrated in FIG. 2 and a chamber cooling mode illustrated in FIG. 3. First, in condensing mode as shown in FIG. 2, the first heat exchanger 50 conditions an airflow 54 input to the first heat exchanger 50 by thermal energy exchange with a coolant flow 56 input into the first heat exchanger 50. The coolant flow 56 is output from the first heat exchanger 50 at a coolant outlet 58, while the conditioned airflow 54 is output from the first heat exchanger 50 at an air outlet 60. The coolant flow 56 may be a liquid, gas or other. The conditioned airflow 54 is then directed to the second heat exchanger 52 via a first valve 62. As described above regarding FIG. 1, the processing chamber 16 outputs gas effluent 26. This gas effluent 26 is directed to the second heat exchanger 52 where thermal energy is exchanged with the conditioned airflow 54, thus condensing water 32 from the gas effluent 26. The water 32 is condensed from the gas effluent forming a two-phase flow which then proceeds to the separator 30. The water 32 is directed from the separator 30 to the water collector 36, while gas byproducts from the separator 30 are returned to the processing chamber 16 via the recirculation line 38. After passing through the second heat exchanger 52, the conditioned airflow 54 is output via second valve 64. In some embodiments, only a single heat exchanger is utilized, and the coolant flow 56 is applied directly to the condenser 28 and/or the processing chamber 16. Referring now to FIG. 3, via operation of the first valve 62 and the second valve 64, the thermal control assembly 48 may be configured to operate in the chamber cooling mode to cool the processing chamber 16. In chamber cooling mode, the first valve 62 directs the conditioned airflow 54 to the processing chamber 16, where the conditioned airflow 54 cools the processing chamber 16. The conditioned airflow 4 is output from the processing chamber 16 via the second valve 64.

When the desired amount of water 32 is removed from the waste 12/14 and recovered at the water collector 36, and/or the desired degree of compaction of the solid waste 14 is achieved and/or the solid waste 14 is sterilized, the process is stopped. The dry gas 40 is directed to a gas collector 42 for venting via a vent, and/or reuse. In some embodiments, the dry gas 40 is passed through a catalytic oxidation interphase and/or a sorbent bed to process the dry gas 40 to allow for its venting back into a human habitable cabin or environment. The solid byproducts of the multi-waste processor 10 are geometrically stable and in some embodiments sterile, facilitating their handling and storage. In other embodiments where the solid waste 14 is not heated sufficiently for sterilization, the solid byproducts may be placed, for example, in Ag-containing bags to facilitate safe handling. The solid byproducts may be reused as, for example, a radiation insulation material, a construction block or an energy source. In some embodiments, the water 32 collected at the water collector 36 may be further processed at, for example, a water processing system so that the water 32 may be recycled for further use.

Figure 5:
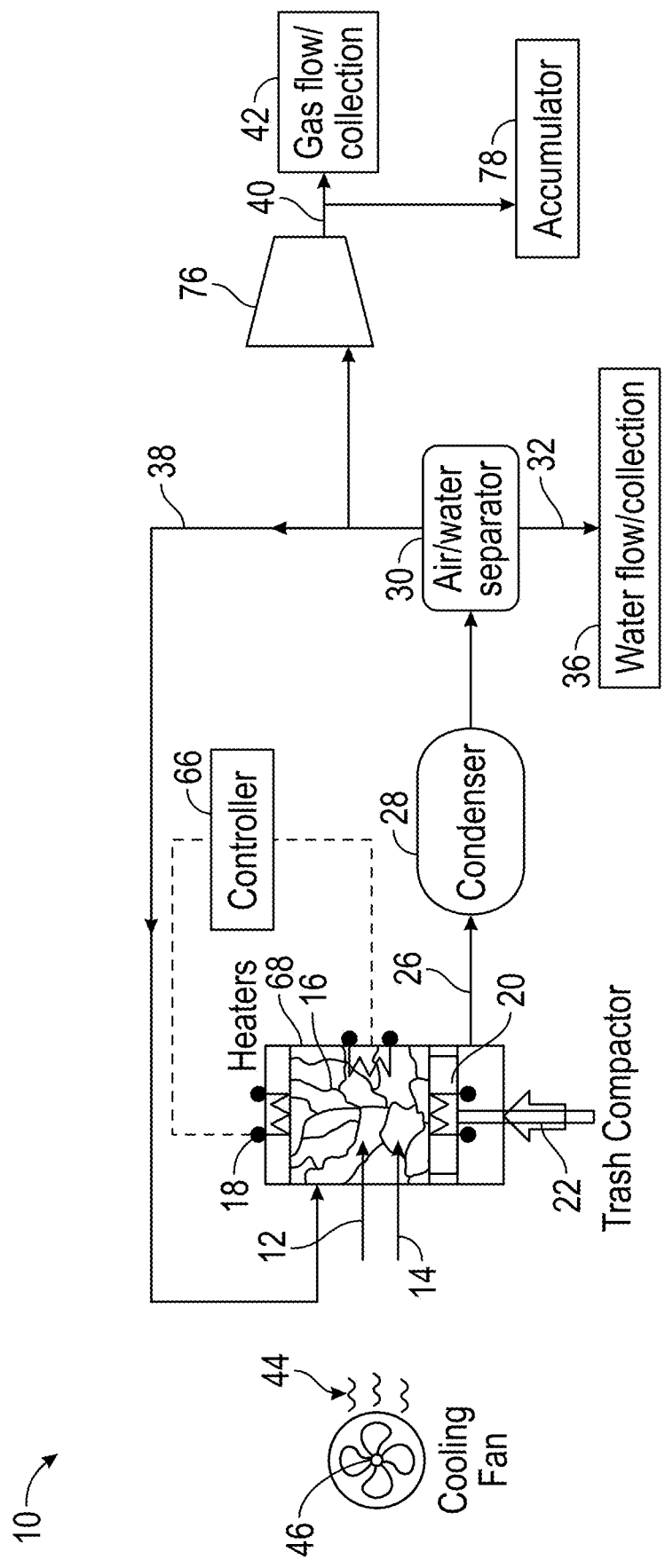
FIG. 5 is a schematic illustration of another embodiment of a multi-waste processor.

In another embodiment, such as illustrated in FIG. 5, the multi-waste processor 10 includes a compressor 76 and an accumulator 78 in order to contain the effluents in the off nominal event such that the venting capabilities are disabled or unavailable while the multi-waste processor 10 is still continuing to process the waste contents. In such configurations, the dry gas 40 is compressed at the compressor 76 and then routed to and stored at the accumulator 78 until such time as it can be vented. Further, the compressor 76 may be utilized to lower the pressure in the processing chamber 16, in addition to or in place of the vacuum pump 24.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A multi-waste processing system, comprising:
   a processing chamber, the processing chamber including one or more heaters and a piston, the processing chamber configured to evaporate liquid waste and compact solid waste input;
   a condenser operably connected to the processing chamber, the condenser configured to condense water from the evaporated liquid waste output from the processing chamber; and
   a gas and water separator operably connected to the condenser, the gas and water separator configured to separate water from the evaporated liquid waste output from the processing chamber; and
   a recirculation pathway connecting the gas and water separator to the processing chamber to recirculate gas from the gas and water separator to the processing chamber;
   wherein the piston is actuated to keep the one or more heaters in close proximity to the solid waste and the liquid waste in the processing chamber.

2. The multi-waste processing system of claim 1, further comprising a water collector operably connected to the gas and water separator.

3. The multi-waste processing system of claim 1, further comprising a vacuum pump operably connected to the processing chamber to reduce a pressure inside the processing chamber thereby reducing a boiling point of the liquid waste.

4. The multi-waste processing system of claim 1, wherein the one or more heaters are configured to sterilize the compacted solid waste.

5. The multi-waste processing system of claim 4, wherein the processing chamber is configured to produce geometrically stable compacted solid waste.

6. The multi-waste processing system of claim 1, wherein the piston is driven by one of a linear actuator or a screw drive.

7. The multi-waste processing system of claim 1, further comprising a vent to dispose of or collect processed gas.

8. The multi-waste processing system of claim 1, further comprising a catalytic oxidation reactor thermally integrated with the processing chamber.

9. The multi-waste processing system of claim 1, further comprising:
   a compressor configured to compress processed gas; and
   an accumulator to store the compressed processed gas.

10. The multi-waste processing system of claim 1, wherein the solid waste is compacted greater than 80%.

11. The multi-waste processing system of claim 1, wherein a heater of the one or more heaters is disposed in the piston.

12. A method of multi-waste processing, comprising:
   inputting a volume of solid waste and a volume of liquid waste into a processing chamber;
   heating the processing chamber via one or more heaters to evaporate the liquid waste therein;
   outputting the evaporated liquid waste in gas phase to a condenser from the processing chamber;
   condensing liquid water from the evaporated liquid waste in gas phase at the condenser;
   separating water from gas at a gas and water separator downstream of the condenser;
   directing gaseous products of the gas and water separator to the processing chamber via a recirculation line;
   compressing processed gas at a compressor; and
   storing the compressed processed gas at an accumulator.

13. The method of claim 12, further comprising compacting the solid waste at the processing chamber via actuation of a piston at the processing chamber.

14. The method of claim 13, wherein the compacted solid waste is geometrically stable.

15. The method of claim 13, wherein the solid waste is compacted greater than 80%.

16. The method of claim 12, further comprising collecting the condensed water at a water collector.

17. The method of claim 12, further comprising reducing a pressure inside the processing chamber thereby reducing a boiling point of the liquid waste.

18. The method of claim 12, further comprising disposing of a processed gas via a vent.

19. The method of claim 12, further comprising treatment of the gas via catalytic oxidation in a reactor that is thermally integrated with the processing chamber.

* * * * *